No. 666,984. Patented Jan. 29, 1901.
W. L. STINE.
TUBE CUTTER AND EXPANDER.
(Application filed Apr. 16, 1900.)
(No Model.)
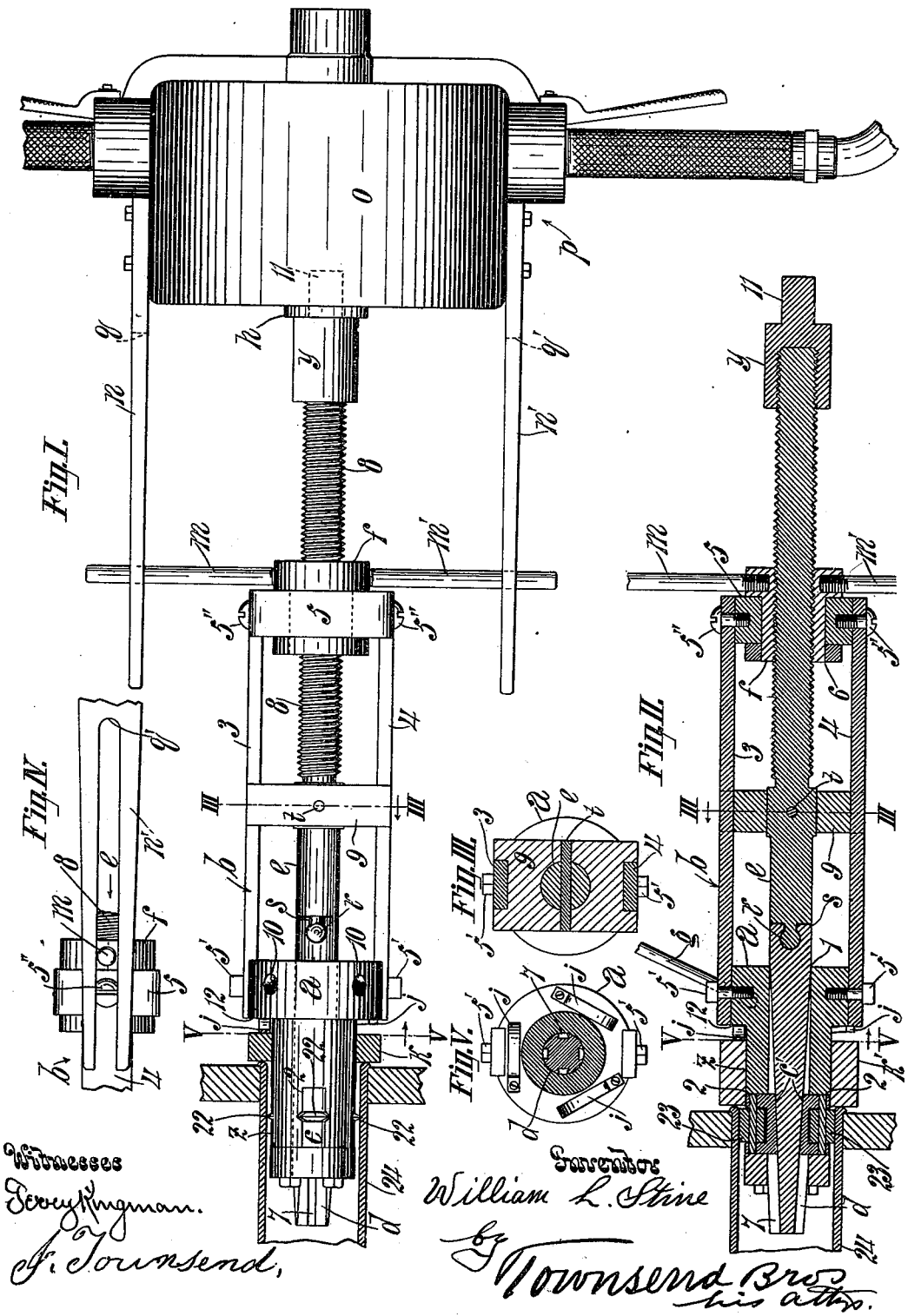

UNITED STATES PATENT OFFICE.

WILLIAM L. STINE, OF SIMI, CALIFORNIA, ASSIGNOR OF ONE-HALF TO LOUIS MAULHARDT, OF EL RIO, CALIFORNIA.

TUBE CUTTER AND EXPANDER.

SPECIFICATION forming part of Letters Patent No. 666,984, dated January 29, 1901.

Application filed April 16, 1900. Serial No. 13,132. (No model.)

*To all whom it may concern:*

Be it known that I, WILLIAM L. STINE, a citizen of the United States, residing at Simi, in the county of Ventura and State of California, have invented new and useful Improvements in Tube Cutters and Expanders, of which the following is a specification.

My present invention relates to improvements over a combination internal tube cutter and expander for which I filed an application for Letters Patent of the United States on the 2d day of February, 1899, Serial No. 704,261.

The object of my present invention is to add to the convenience of operating the tube cutter and expander by hand and also to make provision for the ready and convenient operation of the implement by any power-machine.

My newly-invented tube cutter and expander can be operated by means of a flexible shaft or by means of a pneumatic motor or by power applied in any other way. It is adapted to be readily detached from the machine-power and at once operated by hand. Provision is also made for ready attachment to different power-machines.

The accompanying drawings illustrate my invention.

Figure I is a side elevation of the appliance in operation as a tube-cutter in a tube *a* fragment of which is shown in longitudinal mid-section. A pneumatic motor is shown in position for operating the device. Fig. II is an axial sectional view of the appliance in use as a tube-expander. A portion of the tube and tube-sheet is also shown in longitudinal mid-section. A fragment of a pin for turning the tool by hand is also shown. Fig. III is a cross-section on line III III, Figs. I and II, through the cross-head, which slides lengthwise of the axis of the sleeve. Fig. IV is a fragmental view, in side elevation, to show one of the slotted arms and the thrust-nut-holding arm in the slot. Fig. V is a sectional detail on line V V, Figs. I and II.

*a* indicates the tool-carrying sleeve, having an axial longitudinal guideway 1 and four radial guideways 2.

*b* indicates a yoke fastened to the sleeve and forming a guide extension of the sleeve. This yoke is virtually a part of the sleeve and may be formed integral with the body of the sleeve, but is preferably composed of two side bars 3 4 and a head 5, the side bars being fastened at one end to the sleeve and fastened at the other end to the head 5 by bolts or screws 5″ 5″, a perforation 6 being provided in the head of the yoke coaxial with the axial guideway 1 of the sleeve.

*c* indicates the cutter-carriers, and *c'* the roller-carriers in the radial guideways.

*d* indicates the tool-operating mandrel in the axial guideway to move endwise of the sleeve and provided with longitudinally-arranged carrier-retaining grooves 7, which converge at one end toward the axis of the mandrel in the ordinary way to receive the inner portions of the carriers to move the carriers in and out in the ordinary way as the mandrel is moved longitudinally of the sleeve.

*e* indicates a stock provided with a screw-threaded portion 8 and connected with the mandrel by a ball-and-socket joint, which allows the stock and mandrel to rotate independently of each other, while the endwise movement of the stock causes a like movement of the mandrel. The mandrel and stock do not ordinarily rotate relative to each other; but this provision is made so that in the practical operation of the tool if there is any twisting of the stock relative to the tool-operating mandrel there will not be any consequent binding of the mandrel upon the tool-carriers of the sleeve. The stock is provided with a cross-head 9, fixed to the stock and mounted to slide endwise of the guideway formed by the side bars 3 4 of the yoke and to hold the stock from rotating relative to the sleeve.

*f* indicates a thrust-nut journaled to turn in the head 5 of the yoke and screwed upon the screw-threaded portion 8 of the stock.

Means, such as the lever *g* or the power-shaft *h*, are provided for turning the sleeve. The lever *g* fits in holes 10 in the sleeve and slants away from the tool-holding body *z* of the sleeve, so as to not interfere with the tube-sheet when in use. The power-shaft *h* fits upon the angular shank or stem 11 of a nut *y*, which screws home on the screw-threaded end of the stock and is used to turn the stock. The purpose of providing a removable shank or stem is to allow differently-socketed shafts to be applied to the same stock by simply changing the nuts *y*. A number of nuts having the appropriately-sized angular shanks will be provided, so that the stock can be used with various-sized power-shafts.

*m* indicates a lever affording means for holding and turning the thrust-nut *f*. When the stock is turned by power, the thrust-nut is to be held stationary, while the sleeve and the stock rotate together. When hand-power is used, the sleeve will be turned back and forth and the thrust-nut will be turned intermittently, as required.

The tool-carrying sleeve is provided with a shoulder 12, and springs *j* are fastened to the shoulder on the side thereof which is next to the tools (either cutters or rollers) carried by the sleeve.

*k* indicates a collar to fit upon the sleeve between the springs and the tools carried by the sleeve to engage the end of the tube and to gage the depth in the tube at which the cutters or expanding-rollers will come into contact with the tube. It is desirable to cut the tube as close to the tube-sheet as possible. The tube-sheets are not of uniform thickness, and therefore collars of different lengths are provided, so as to bring the tools to the appropriate place in the tube when the sleeve is inserted to bring the collar against the tube-sheet and in engagement with the springs. The springs are curved at the ends, so that they will not cause any resistance to the rotation of the sleeve.

*m m'* indicate two levers or arms screwed into the nut *f* for the purpose of holding the nut or rotating it, as may be required.

*n n'* indicate two bars that are fastened to the case *o* of the power-machine *p*. The bars *n n'* are slotted, as at *q q'*, to receive the arms *m m'*, and the slots extend from the end of the bars *n* to near the case *o*, thus to give the necessary length of movement of the power-machine *p* relative to the sleeve as the mandrel moves in and out.

In practical operation for hand use the sleeve provided with the appropriate tools will be inserted into the tube to be operated upon and the workman will hold the thrust-nut-operating lever with one hand and the sleeve-operating lever with the other hand and will rotate the sleeve back and forth, say, a third of the way around and from time to time as required will turn the thrust-nut sleeve, thus to force the stock and mandrel forward to throw the tools outward to increase their action upon the tube. If power is taken from a power-machine, the lever *g* for operating the sleeve will be dispensed with and the power-shaft is applied to the shank 11 of the nut at the end of the stock and the bars *n n'* brought into position to hold the arms *m m'*. Then the workman will insert the sleeve with the appropriate tools into the tube to be cut or expanded and will turn on the power to cause the shaft *h* to rotate, thus to rotate the stock *e*, and through the cross-head 9 and side bar *b* rotate the sleeve *a* with the mandrel *d*. The levers or arms *m m'* being inserted through the slots *q q'* in the arms *n n'* hold the nut *f* from rotating, and therefore when the screw-threaded stock turns it is advanced by its screw-threads to force the mandrel *d* in to force the tool-carriers *c* (or *c'*, as the case may be) out to do the required work. In case the cross-head 9 should become worn and work loosely on the bars 3 4, the ball-and-socket joint *r s* wil prevent any twisting motion from being applied from the stock to the mandrel *d* to twist it relative to the sleeve to bind in the sleeve. The socket *s* in the mandrel is slotted from one side to admit the neck of the ball member *r* of the joint into the socket, so that the tool is readily removable.

*l* indicates a pin which fastens the stock *e* in the cross-head 9, which slides on the bars 3 4 of the sleeve.

Two sets of carriers or followers, one for rollers and the other for cutters, will go with each machine to be used interchangeably.

The springs *j* are arranged to normally hold the collar *k* at a sufficient distance away from the shoulder 12 of the sleeve to allow the collar *k* to yield toward the shoulder 12 to relieve any endwise pressure which might occur by reason of the beveled edges of the cutters 22 as the cutters are forced outward in the act of cutting the tube. The collar *k'* to be used when the rollers 23 are employed for expanding the tool is of appropriate length to fill the space between the springs and the end of the tube 24 when the rollers are appropriately inserted for expanding the tool.

What I claim, and desire to secure by Letters Patent of the United States, is—

1. A tube cutter and expander comprising a sleeve having an axial longitudinal guideway and radial guideways; a yoke fastened to the sleeve and forming a guide extension of the sleeve; a perforation being provided in the head of the yoke coaxial with the axial guideway of the sleeve; tool-carriers in the radial guideways; a pin in the axial guideway to move endwise of the sleeve and provided with longitudinally-arranged carrier-retaining grooves which converge at one end toward the axis of the pin; a stock provided with a screw-threaded portion and connected with the pin to operate the same and provided with a cross-head fixed to the stock and mounted to slide endwise of the guideway formed by the yoke and to hold the stock from rotating relative to the sleeve; a thrust-nut journaled to turn in the head of the yoke and screwed upon the screw-threaded portion of the stock; means for turning the sleeve; and means for holding and turning the thrust-nut.

2. In a tube-cutter, the combination of a tool-carrying sleeve; a yoke fastened to and extending from the sleeve; a thrust-nut journaled in the head of the yoke coaxial with the sleeve; a mandrel to slide endwise in the sleeve; a cross-head connected with the pin and sliding in the guideway formed by the yoke to prevent the pin from turning relative to the sleeve; a screw-threaded stock connected with the pin and screwing through the thrust-nut; means for turning the stock; and means for turning the thrust-nut.

3. In a tube cutter and expander, the combination of the tool-carrying sleeve; a yoke fastened to and projecting from the sleeve to form a guideway; a stock jointed to the mandrel of the appliance, and fastened to the head of the yoke and having a screw-threaded portion; a thrust-nut screwed upon the screw-threaded portion of the stock and journaled in the head of the yoke; means for turning the sleeve; and means for turning the thrust-nut relative to the sleeve.

4. In a tube-cutter, a shouldered tool-carrying sleeve provided with springs fastened to the side of the shoulder which is next to the tools carried by the sleeve.

5. In a tube cutter and expander, the combination of the shouldered tool-carrying sleeve provided with springs fastened to the shoulder on the side thereof which is next to the tools; and a loose collar on the sleeve between the tools and the springs.

6. In a tube cutter and expander, the combination of a tool-carrying sleeve; a tool-operating mandrel to slide axially in the sleeve to operate the tools carried by the sleeve; a stock connected by a ball-and-socket joint with the end of the mandrel and mounted to slide axially of the sleeve without rotating relative thereto and being provided with a screw-threaded portion; a thrust-nut connected with the sleeve to rotate relative to the axis of the sleeve without moving lengthwise of such axis and being screwed upon the screw-threaded portion of the stock; means for simultaneously turning the stock and sleeve; and means for turning the thrust-nut with relation to the sleeve.

7. In a tube cutter and expander, the combination of the tool-carrying sleeve; the tool-operating mandrel sliding in the sleeve; a stock connected with the mandrel to move the same endwise and mounted to move axially of the sleeve without rotating relative to the sleeve and provided with a screw-threaded portion extending beyond the sleeve and its connections; a thrust-nut journaled to rotate relative to the sleeve without moving axially of the sleeve; means for turning the nut; and a removable cap provided with an angular stem connected with the stock to seat in the socket of the shaft of a power-applying device.

In testimony whereof I have signed my name to this specification, in the presence of two subscribing witnesses, at Los Angeles, California, this 9th day of April, 1900.

W. L. STINE.

Witnesses:
JAMES R. TOWNSEND,
JULIA TOWNSEND.